S. H. PETRO.
COOKING UTENSIL.
APPLICATION FILED JUNE 2, 1916.

1,304,508.

Patented May 20, 1919.

Samuel H. Petro
Inventor

By Geo. P. Kimmel
Attorney

UNITED STATES PATENT OFFICE.

SAMUEL H. PETRO, OF LOS ANGELES, CALIFORNIA.

COOKING UTENSIL.

1,304,508.     Specification of Letters Patent.     Patented May 20, 1919.

Application filed June 2, 1916. Serial No. 101,336.

*To all whom it may concern:*

Be it known that I, SAMUEL H. PETRO, a citizen of the United States, and resident of Los Angeles, in the county of Los Angeles and State of California, have invented certain new and useful Improvements in Cooking Utensils, of which the following is a specification.

The present invention relates to cooking utensils and has particular reference to new and useful improvements in corn popping devices, the primary object of my invention being to provide a device of the character mentioned which is simple in construction, strong and durable, and effective in operation.

Another object of my invention is to provide a device of the character described capable of application for use in connection with an ordinary frying pan or the like, or by slight modifications the device may be adapted for use in connection with mechanical corn popping devices.

A further object of my invention is to provide a cooking utensil of the class described having means associated therewith for agitating the articles to be cooked.

Figure 1:
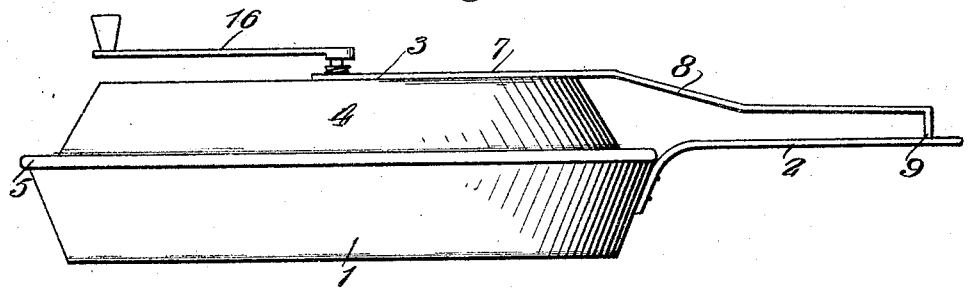
Figure 2:
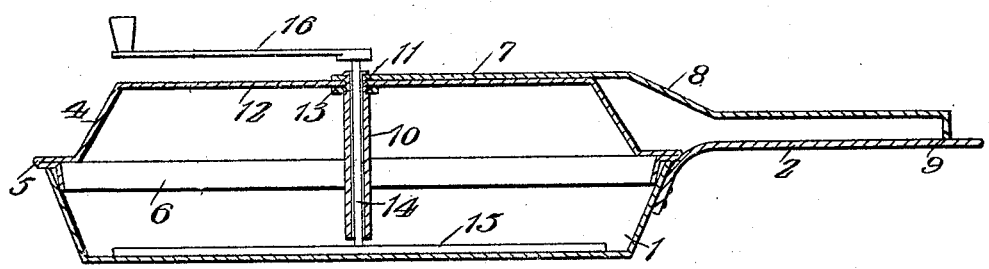

Other objects and advantages to be derived from the use of my improved cooking utensil will appear from the following detail description and the claim, taken with an inspection of the accompanying drawing, in which:

Figure 1 is a side elevational view of a cooking utensil embodying the improvements of my invention; and Fig. 2 is a transverse vertical sectional view taken through the same.

Referring more particularly to the drawing, wherein similar characters of reference designate like and corresponding parts throughout the various views, 1 designates a frying pan or the like, the same being of the usual construction and having a handle 2 extending therefrom.

The preferred form of my invention is best shown in Figs. 1 and 2 and includes a body portion 3, preferably circular in configuration, the side wall 4 thereof being provided at the free marginal edge with a radial annular flange 5, said wall being further folded upon itself to provide a downwardly directed annular flange 6, said flanges 5 and 6 coöperating to engage the upper marginal edge of a frying pan 1 to prevent dislodgment of the body 3 of my improved corn popping device.

The body 3 is provided with a handle portion 7 extending radially of the body, said handle portion being offset as at 8 and resting as at 9 on the handle of the frying pan.

The device of my invention is provided with agitating means, said means including a tubular bearing member 10 adapted for threaded engagement as at 11 with the handle 7 and wall 12 of the body 3, a locking nut 13 being arranged on said tubular member for an obvious purpose. The agitating element itself is composed of a rod 14 arranged for rotation in the tubular bearing member 10, the inner free end of the rod having an arm 15 associated therewith, said arm being arranged at right angles to said rod and adapted to lie on the base of the frying pan 1. A crank 16 is carried by the outer free end of the rod 14 for imparting rotary movement to said rod.

It will be seen that in the use of my improved attachment for cooking utensils I have provided a device which is particularly adapted for use in connection with corn popping devices and the like, the body 3 of the device serving to retain the steam or heat within the utensil giving a richer flavor to the article being cooked. It will be apparent that the free ends of the handle member 7 may be gripped, together with the handle 2 when transporting the cooking utensil and my improved attachment from place to place.

From the above description taken in connection with the accompanying drawing, it is thought that a clear and comprehensive understanding of the construction, operation and advantages of my invention may be had, and while I have shown and described my invention as embodying a specific structure, I desire that it be understood that such changes may be made in said structure as do not depart from the spirit and scope of the invention as claimed.

Having thus fully described my invention, what I claim as new and desire to secure by Letters Patent, is:—

The combination with a receptacle having a handle projecting laterally therefrom, of a cover including a body having a downwardly bent marginal portion, a laterally projecting shoulder formed at the lower portion of the marginal portion, an annular flange depending from the under surface of the shoulder in proximity to the upper portion of the shoulder, a handle comprising a strip of material offset medially of its ends, one portion of the handle being secured to the body of the cover the other portion being adapted to lie over the handle of the receptacle, and a leg depending from the terminal of the free offset portion and contacting with the handle of the receptacle near the outer end thereof.

In testimony whereof, I affix my signature hereto.

SAMUEL H. PETRO.

Copies of this patent may be obtained for five cents each, by addressing the "Commissioner of Patents, Washington, D. C."